(12) United States Patent
Chiang

(10) Patent No.: US 8,657,201 B2
(45) Date of Patent: *Feb. 25, 2014

(54) FILTER-FREE PROJECTOR

(75) Inventor: Kuo-Ching Chiang, New Taipei (TW)

(73) Assignee: Bascule Development AG LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,482

(22) Filed: Jan. 20, 2012

(65) Prior Publication Data

US 2012/0113396 A1    May 10, 2012

Related U.S. Application Data

(63) Continuation of application No. 12/954,687, filed on Nov. 26, 2010, now Pat. No. 8,127,995, which is a continuation of application No. 11/783,551, filed on Apr. 10, 2007, now Pat. No. 7,874,486.

(51) Int. Cl.
*G06K 7/10* (2006.01)
(52) U.S. Cl.
USPC .................................................. 235/472.02
(58) Field of Classification Search
USPC .......... 235/472.01, 472.02; 345/690; 353/30, 353/31, 94; 348/742, 744; 455/566
See application file for complete search history.

(56) References Cited

U.S. PATENT DOCUMENTS

| | | | |
|---|---|---|---|
| 4,665,385 A | 5/1987 | Henderson | |
| 4,737,448 A | 4/1988 | Hochberg | |
| 4,809,810 A | 3/1989 | Elfman | |
| 5,050,965 A | 9/1991 | Conner | |
| 5,124,818 A | 6/1992 | Conner | |
| 5,150,138 A | 9/1992 | Nakanishi | |
| 5,517,189 A | 5/1996 | Bachhuber | |
| 5,537,258 A | 7/1996 | Yamazaki | |
| 5,818,634 A | 10/1998 | Richard | |
| 5,883,465 A | 3/1999 | Inoguchi | |
| 5,907,407 A | 5/1999 | Atkinson | |
| 6,023,371 A | 2/2000 | Onitsuka | |
| 6,052,166 A | 4/2000 | Chikazawa | |
| 6,073,034 A | 6/2000 | Jacobsen | |
| 6,085,112 A | 7/2000 | Kleinschmidt | |
| 6,292,305 B1 | 9/2001 | Sakuma | |

(Continued)

FOREIGN PATENT DOCUMENTS

| | | |
|---|---|---|
| CN | 101561620 A | 10/2009 |
| EP | 1 416 702 A1 | 5/2004 |

(Continued)

OTHER PUBLICATIONS

Final Office Action mailed Aug. 14, 2012, in U.S. Appl. No. 11/701,158, filed Jan. 31, 2007, 17 pages.
Office Action mailed Nov. 7, 2012, in U.S. Appl. No. 11/701,158, filed Jan. 31, 2007, 10 pages.
Cotting, D., et al., "Embedding Imperceptible Patterns Into Projected Images for Simultaneous Acquisition and Display," Proceedings of the Third IEEE and ACM International Symposium on Mixed and Augmented Reality (ISMAR '04), Washington, D.C., Nov. 2-5, 2004, 10 pages.

(Continued)

*Primary Examiner* — Jamara Franklin
(74) *Attorney, Agent, or Firm* — Christensen O'Connor Johnson Kindness PLLC

(57) ABSTRACT

A filter-free projector includes a light source unit to generate light beams with different colors and a color control module coupled to the light source unit for switching the light source unit to emit one color light at a time. A digital mirror device panel having a plurality of mirror elements is provided so as to reflect light fed from the light source unit. A projection lens is positioned in the reflected light path from the digital mirror device panel to project the image.

13 Claims, 5 Drawing Sheets

(56) References Cited

U.S. PATENT DOCUMENTS

| | | |
|---|---|---|
| 6,552,754 B1 | 4/2003 | Song |
| 6,556,181 B2 | 4/2003 | Yamada |
| 6,594,616 B2 | 7/2003 | Zhang |
| 6,626,543 B2 | 9/2003 | Derryberry |
| 6,655,597 B1 | 12/2003 | Swartz |
| 6,710,909 B2 | 3/2004 | Naito |
| 6,733,137 B2 | 5/2004 | Tomiya |
| 6,805,448 B2 | 10/2004 | Yokoyama |
| 6,988,808 B2 | 1/2006 | Cromer |
| 7,050,035 B2 | 5/2006 | Iisaka |
| 7,059,732 B2 | 6/2006 | Oross |
| 7,070,281 B2 | 7/2006 | Kato |
| 7,170,671 B2 | 1/2007 | Wu |
| 7,173,586 B2 | 2/2007 | Osame |
| 7,178,735 B2 | 2/2007 | Chiang |
| 7,213,924 B2 | 5/2007 | Okuyama |
| 7,270,425 B2 | 9/2007 | Arai |
| 7,303,291 B2 | 12/2007 | Ikeda |
| 7,311,403 B2 | 12/2007 | Yoshii |
| 7,434,945 B2 | 10/2008 | Maeda |
| 7,500,758 B1 | 3/2009 | Adachi |
| 7,724,247 B2 | 5/2010 | Yamazaki |
| 7,751,650 B2 | 7/2010 | Tada |
| 7,874,486 B2 | 1/2011 | Chiang |
| 7,896,501 B2 | 3/2011 | Huang |
| 7,914,150 B2 | 3/2011 | Yamazaki |
| 8,021,001 B2 | 9/2011 | Iwanaga |
| 8,045,273 B2 | 10/2011 | Chen |
| 8,052,281 B2 | 11/2011 | Huang |
| 8,127,995 B2 | 3/2012 | Chiang |
| 2002/0036694 A1 | 3/2002 | Merril |
| 2003/0092470 A1 | 5/2003 | Kurakane |
| 2004/0017518 A1 | 1/2004 | Stern |
| 2004/0135975 A1 | 7/2004 | Wang |
| 2004/0206825 A1 | 10/2004 | Schmidt |
| 2004/0207822 A1 | 10/2004 | Lee |
| 2004/0224081 A1 | 11/2004 | Sheu |
| 2004/0268383 A1 | 12/2004 | Sezan |
| 2005/0005102 A1 | 1/2005 | Meggitt |
| 2005/0035701 A1 | 2/2005 | Choi |
| 2005/0054337 A1 | 3/2005 | Nobusawa |
| 2005/0083486 A1 | 4/2005 | Johnson |
| 2005/0127375 A1 | 6/2005 | Erchak |
| 2006/0007364 A1 | 1/2006 | Kuan |
| 2006/0023172 A1 | 2/2006 | Ikeda |
| 2006/0098451 A1 | 5/2006 | Hsu |
| 2006/0102713 A1 | 5/2006 | Chiang |
| 2006/0146007 A1 | 7/2006 | Lim |
| 2006/0209374 A1 | 9/2006 | Willemsen |
| 2007/0001104 A1 | 1/2007 | Yokote |
| 2007/0080845 A1 | 4/2007 | Amand |
| 2007/0132963 A1 | 6/2007 | Chiang |
| 2007/0146655 A1 | 6/2007 | Li |
| 2007/0195287 A1 | 8/2007 | Chiang |
| 2008/0100804 A1 | 5/2008 | Kanayama |
| 2008/0180641 A1 | 7/2008 | Chiang |
| 2008/0259283 A1 | 10/2008 | Maeda |
| 2008/0297729 A1 | 12/2008 | Fujinawa |
| 2009/0315921 A1 | 12/2009 | Sakaigawa |
| 2010/0079734 A1 | 4/2010 | Rehn |
| 2010/0091249 A1 | 4/2010 | Benedix |
| 2010/0149437 A1 | 6/2010 | Chiang |
| 2010/0159850 A1 | 6/2010 | Chiang |
| 2010/0328935 A1 | 12/2010 | Pance |
| 2011/0090466 A1 | 4/2011 | Chiang |
| 2011/0242392 A1 | 10/2011 | Chiang |
| 2011/0310357 A1 | 12/2011 | Chiang |
| 2012/0081408 A1 | 4/2012 | Chiang |
| 2012/0133899 A1 | 5/2012 | Chiang |
| 2012/0170003 A1 | 7/2012 | Chiang |
| 2013/0127934 A1 | 5/2013 | Chiang |

FOREIGN PATENT DOCUMENTS

| | | |
|---|---|---|
| TW | 200742929 A | 3/2002 |
| TW | M334948 U | 6/2008 |
| TW | 200841109 A | 10/2008 |
| TW | 200905361 A | 2/2009 |
| TW | 200937099 A | 9/2009 |
| WO | 2005/006720 A1 | 1/2005 |

OTHER PUBLICATIONS

Van Kessel, P.F., et al., "A MEMS-Based Projection Display," Proceedings of the IEEE, 86(8):1687-1704, Aug. 1998.

Office Action mailed Jun. 3, 2005, in U.S. Appl. No. 10/989,622, filed Nov. 15, 2004, 9 pages.

Office Action mailed Nov. 16, 2005, in U.S. Appl. No. 10/989,622, filed Nov. 15, 2004, 10 pages.

Final Office Action mailed May 17, 2006, in U.S. Appl. No. 10/989,622, filed Nov. 15, 2004, 10 pages.

Notice of Allowance mailed Oct. 6, 2006, in U.S. Appl. No. 10/989,622, filed Nov. 15, 2004, 8 pages.

Restriction Requirement mailed Dec. 1, 2008, in U.S. Appl. No. 11/701,158, filed Jan. 31, 2007, 5 pages.

Office Action mailed Apr. 2, 2009, in U.S. Appl. No. 11/701,158, filed Jan. 31, 2007, 17 pages.

Final Office Action mailed Nov. 9, 2009, in U.S. Appl. No. 11/701,158, filed Jan. 31, 2007, 8 pages.

Advisory Action mailed Feb. 3, 2010, in U.S. Appl. No. 11/701,158, filed Jan. 31, 2007, 4 pages.

Office Action mailed Feb. 29, 2012, in U.S. Appl. No. 11/701,158, filed Jan. 31, 2007, 9 pages.

Office Action mailed May 6, 2010, in U.S. Appl. No. 11/783,551, filed Apr. 10, 2007, 10 pages.

Notice of Allowance mailed Oct. 28, 2010, in U.S. Appl. No. 11/783,551, filed Apr. 10, 2007, 7 pages.

Office Action mailed Jan. 12, 2010, in U.S. Appl. No. 11/734,175, filed Apr. 11, 2007, 11 pages.

Office Action mailed May 17, 2011, in U.S. Appl. No. 12/711,366, filed Feb. 24, 2010, 5 pages.

Office Action mailed Nov. 10, 2010, in U.S. Appl. No. 12/718,150, filed Mar. 5, 2010, 5 pages.

Final Office Action mailed Apr. 5, 2011, in U.S. Appl. No. 12/718,150, filed Mar. 5, 2010, 7 pages.

Office Action mailed Sep. 7, 2011, in U.S. Appl. No. 12/954,687, filed Nov. 26, 2010, 8 pages.

Notice of Allowance mailed Nov. 18, 2011, in U.S. Appl. No. 12/954,687, filed Nov. 26, 2010, 8 pages.

Office Action mailed Jan. 14, 2013, in U.S. Appl. No. 13/237,934, filed Sep. 21, 2011, 18 pages.

Office Action dated Jun. 6, 2013, in U.S. Appl. No. 11/701,158, filed Jan. 31, 2007, 12 pages.

Notice of Allowance dated Jun. 3, 2013, in U.S. Appl. No. 13/237,934, filed Sep. 21, 2011, 13 pages.

Office Action dated Jul. 18, 2013, in U.S. Appl. No. 12/987,118, filed Jan. 9, 2011, 30 pages.

Chinese Office Action dated Mar. 6, 2013, in Chinese Patent Application No. 201010133379.5, filed Mar. 10, 2010, 10 pages.

Taiwanese Office Action dated Sep. 6, 2013, in Taiwanese Patent Application No. 099141526, filed Nov. 30, 2010, 15 pages.

Taiwanese Office Action dated Sep. 24, 2013, in Taiwanese Application No. 100121326, filed Jun. 7, 2011, 5 pages.

Office Action dated Nov. 15, 2013, in U.S. Appl. No. 13/152,621, filed Jun. 3, 2011, 39 pages.

Taiwanese Office Action dated Nov. 18, 2013, in Taiwanese Patent Application No. 099106049, filed Mar. 2, 2010, 6 pages.

Office Action dated Dec. 2, 2013, in U.S. Appl. No. 13/214,496, filed Aug. 22, 2011, 40 pages.

Office Action dated Dec. 27, 2013, in U.S. Appl. No. 13/342,509, filed Jan. 31, 2007, 42 pages.

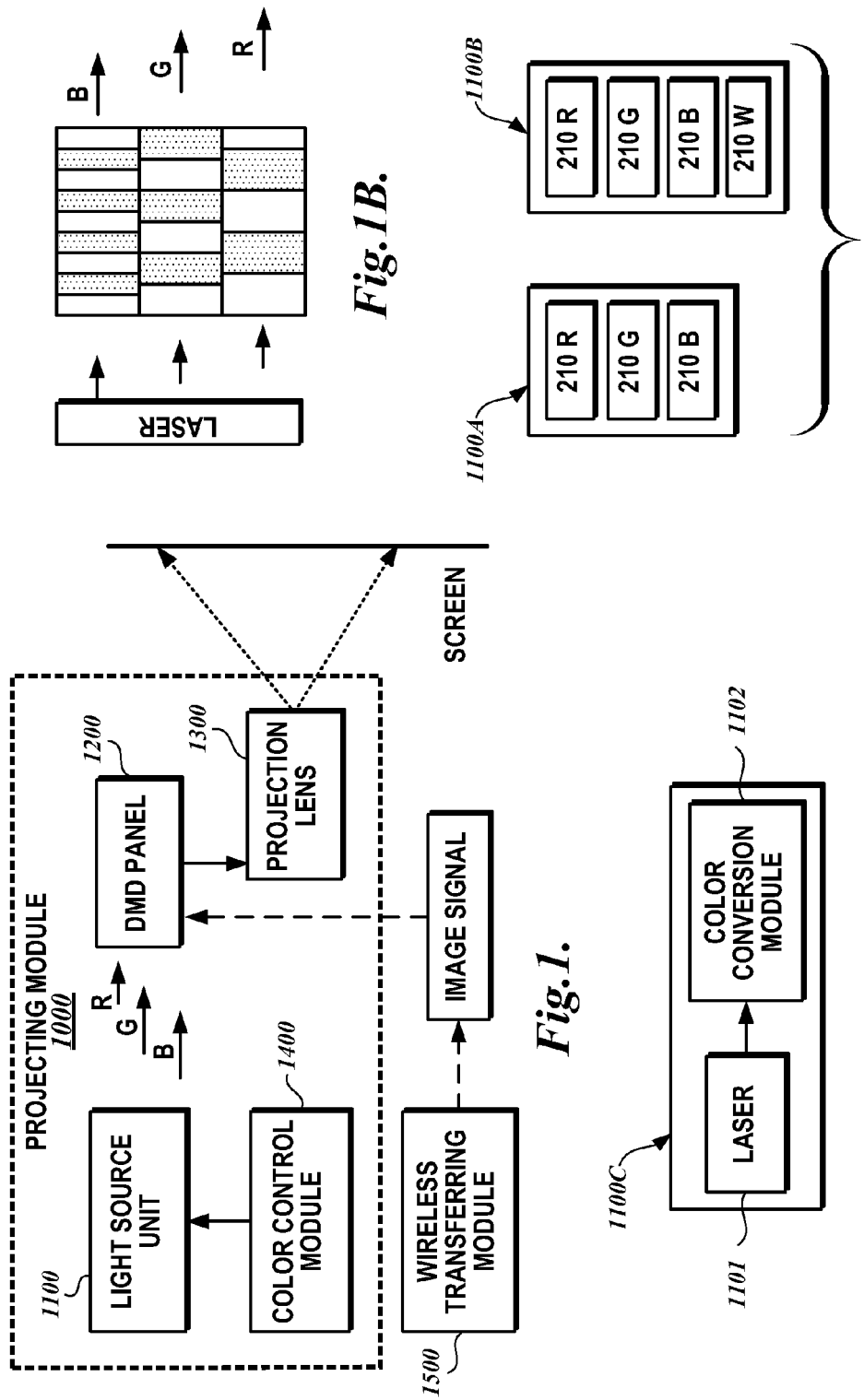

FILTER-FREE PROJECTOR

CROSS-REFERENCE TO RELATED APPLICATIONS

This application is a continuation of U.S. patent application Ser. No. 12/954,687, filed Nov. 26, 2010 now U.S. Pat. No. 8,127,995, which is a continuation of U.S. patent application Ser. No. 11/783,551, filed Apr. 10, 2007, now U.S. Pat. No. 7,874,486.

BACKGROUND

Cellular communications systems typically include multiple base stations for communicating with mobile stations in various geographical transmission areas. Each base station provides an interface between the mobile station and a telecommunications network. Mobile telephone systems are in use or being developed in which the geographic coverage area of the system is divided into smaller separate cells, each of which communicates with the network via a fixed station located in the cell. Mobile telephones belonging to the system are free to travel from one cell to another. When a subscriber within the same system or within an external system wishes to call a mobile subscriber within this system, the network must have information on the actual location of the mobile telephone.

Recently, the price of cellular telephones has been greatly reduced and become affordable to more people. It is common that a person owns more than one cellular phone. Some people even replace their cellular telephones as often as they replace their clothes or hairstyle. The cellular manufacturers have to release new models with different appearances, functions, and styles more frequently so as to attract the attention of buyers and occupy a favorable market share. Furthermore, the conventional projector employs a white light lamp as a light source; therefore, at least two reflector lenses and at least three light-split lenses are required to split the white light into three colors (red, green, and blue). The optical lens set is expensive. The mechanism of the optical system is complicated and the size is difficult to reduce. Further, the lamp source will generate heat at a high temperature. Another type of projector is called a digital light projector. U.S. Pat. Nos. 6,733,137 and 6,988,808 disclose such projectors. The type of projector employs DMD (digital micro-mirror device) and a color wheel for projecting. The digital minor device has several hundreds of thousands of mirror elements and is capable of reducing a difference in chromaticness (tint) caused by performance or characteristic variation between filters or between light sources. A driving unit controls an inclination of each of the minor elements of a DMD panel according to a corrected video signal and a revolution state of a color filter wheel. The correcting unit corrects a luminance signal for each color of the video signals by calculating a relative intensity of light having passed through each filter making up the color filter wheel using the output of a photosensor occurring when each mirror element of the DMD panel is put in the OFF state. The color filter wheel is driven by a motor and its size is not small; consequently, it is difficult to embed the projecting device into a portable device. Further, the conventional technology employs white light as the light source and it operates at high temperatures. The projector needs a lot of lenses to cooperate with the light source and the color filter wheel as well. A low-frequency flashing effect occurs due to the white light passing through the high speed revolution color wheel which is driven by the motor. As recognized herein, for portability, it is desirable to configure the projector to be as slim as possible. But the goal of size reduction is frustrated by the presence of the elements mentioned above.

SUMMARY

The present disclosure describes a filter-free projector (FFP) with a color light source. The filter-free projector comprises a light source unit to generate a light beam with different colors; a color control module coupled to the light source unit for switching the light source unit to emit one color light at a time; a digital mirror device panel having a plurality of mirror elements each being controlled so as to reflect light fed from the light source unit; and a projection lens positioned in the reflected light path from the digital minor device panel to project an image. The light source unit includes an organic electroluminescence element, an LED element, a field-emitting element laser diode, or an electroluminescence element to emit illumination of red, green, or blue.

The filter-free projector may be embedded into a portable device such as a cellular phone, notebook computer, GPS device, PDA, game player, media player, video camera, or still camera.

BRIEF DESCRIPTION OF THE DRAWINGS

FIG. 1 shows a diagram of a projector and FIGS. 1A, 1B show a diagram of a color light source unit according to the present disclosure;

FIG. 2 shows a diagram of a color light source unit according to the present disclosure;

DETAILED DESCRIPTION

Figure 3:
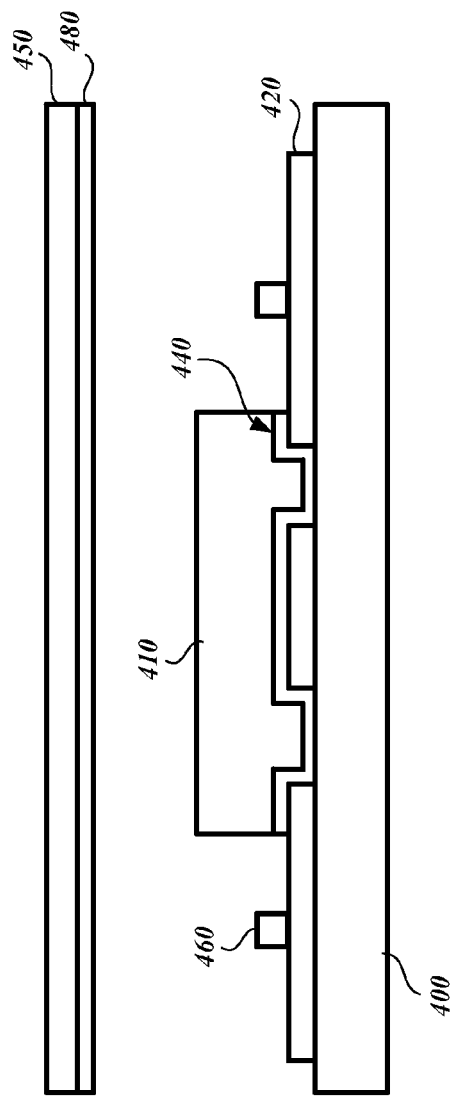
FIG. 3 shows a diagram of a field-emitting device according to the present disclosure.

The present disclosure relates generally to a projecting module for a portable terminal or stand-alone projector. The term portable terminal includes, but is not limited to, a cellular phone, PDA (personal digital assistant), smart phone, notebook computer, media player (MP3, MP4), GPS device, and the like.

FIG. 1 is a diagram illustrating the main components of a filter-free projector using a DMD (Digital Micro-mirror Device) panel according to an embodiment of the present disclosure. The filter-free projector with projecting module 1000 of the embodiment shown in FIG. 1 includes a light source unit 1100, a DMD panel 1200, and projection lens 1300. Some elements (such as a lens amplifier, converter, correcting section, and driving section) also may be included. In one embodiment, a lens amplifier may be located between the light source unit 1100 and the DMD panel 1200. The DMD panel 1200 includes a plurality of micro-minor elements (not shown) and is controlled by the driving section. The driving section produces image light to be projected onto the screen, and the inclination state of each of the mirror elements (not shown) is according to a switching state of the color light source state. The light source unit 1100 may emit mono-light with red, green, or blue, respectively. A color control module 1400 is coupled to the light source unit 1100 to determine which color of light will be emitted. The signal to be fed in from the correcting section and the inclination state of each of the minor elements cooperates with the alternation state of the color light source unit 1100. The color control module 1400 is employed to switch the colors, and it may be formed by integrated circuits. The switching frequency can be higher than the frequency of the image signal. The switching time of the color is far faster than the wheel of the prior art. It reduces time required for switching colors in the color wheel. The switching of the color light unit causes the light to be emitted in order of the red, blue, and green colors, and the switched light is output to DMD panel 1200. Preferably, the color control module 1400 causes the light source unit 1100 to emit the red, blue, and green color light in sequence, and can repeat the sequence. The order of the colors can be altered. The color light source unit 1100 has plural color segments, and if desired for brightness, a white segment. Preferably, the unit 1100 includes a red color segment, followed by a green segment, which in turn is followed by a blue segment. In order to increase image brightness, each blue segment may be followed by a white segment. The DMD panel 1200 receives an input signal with a grayscale signal used to control an inclination of each of the mirror elements according to a grayscale of each video signal. Thus, each frame of grayscale image will be reflected with the R, G, B colors, one by one. Thus, the switching frequency of the sequence light color control module is higher than the frequency of the video signal. Namely, the frequency of each color light is at least three times greater than the frequency of the video signal. If four colors are employed, then the frequency will be four times greater. The multiple frequency of the color control module will make sure each frame of the image will be processed with R, G, B.

Electrical discharge lamps, such as metal halide lamps or halogen lamps, could be used in the light source unit. FIG. 2 shows example light source units 1100A, 1100B. In one embodiment, the light source unit 1100A comprises three light-emitting sources 210R, 210G, and 210B, and is employed and positioned in correspondence with the DMD 1200, respectively. In one embodiment, the light-emitting sources 210R, 210G, and 210B are organic EL (electroluminescence) elements. These organic EL elements are electric-field light-emitting thin films that are capable of emission of red, green, and blue light. The DMD panel 1200 is positioned on the light-incidence side. The projection lens 1300 could be made up of a plurality of lenses. Thus, the data or file stored in the memory of the device or external device can be projected on a screen or wall. It allows the user to project the image, game, or file on an external screen. The EL element is small, flat form, lightweight; therefore, it allows the small projection unit to be integrated in the portable device. The light source unit can be formed by three mono-light EL devices, or a single EL device which may emit three mono-lights. In another case, the unit 1100B may include light-emitting sources 210W for emitting white light. The light-emitting source may be made of thin film, and therefore it can be embedded into the portable device.

The digital minor device panel has a plurality of mirror elements each being controlled so as to be put in a first inclination state and in a second inclination state and reflecting light fed from the light source unit and switched by the control module while being put in the first inclination state. A driving unit is used for control, so as to put each of the minor elements in the digital mirror device panel in the first inclination state or the second inclination state according to a corresponding video signal and a switching state of the color control unit. A correcting unit is used to receive a video signal and the voltage obtained by the photoelectric conversion device to correct the video signal, based on the received voltage, and to output the corrected video signal to the driving unit. The color control module 1400 is configured to include a red, a green, and a blue color light source for making image light of the plurality of colors. The projector may include a digital signal processor mounted on a DLP circuit board.

Figure 4:
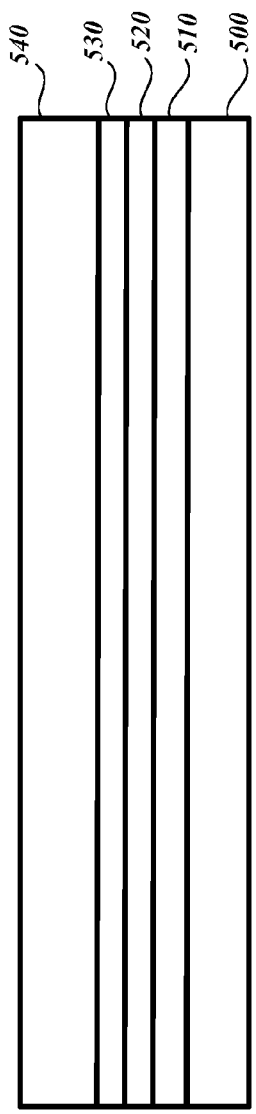
FIG. 4 shows a diagram of an EL-emitting source according to the present disclosure.

Another embodiment of the light source is shown in FIG. 4, which is a cross-sectional view of the field emission device (FED) according to an embodiment of the present disclosure. As seen in FIG. 3, a transparent substrate 400 is provided, and transparent electrodes 420 are formed on the glass substrate 400. The transparent electrodes 420 may be made of indium tin oxide (ITO) and may be used as emitter electrodes. Stacked gate 410 covers a portion of the transparent electrodes 420, which are formed on the glass substrate 400. Emitters 460 that emit electrons are formed on a portion of the transparent electrode 420. Each stacked gate 410 includes a mask layer 440 that covers a portion of the transparent electrodes, and is formed by an ultraviolet (UV) photolithograph mask. The mask layer 440 is preferably transparent to visible light, but opaque to UV rays and can be made of an amorphous silicon layer. The silicon layer will be transparent when the thickness is thin enough. A stacked gate 410 structure includes a first insulating layer, a gate electrode, a second insulating layer, and a focus gate electrode, sequentially formed over the substrate. The gate insulating layer is preferably a silicon oxide thin film with a thickness of 2 μm or more and the gate electrode is made of chrome with a thickness of about 0.25 μm. The gate electrode is used for extracting an electron beam from the emitter. The focus gate electrode performs as a collector for collecting electrons emitted from the emitter so that the electrons can reach a fluorescent film 480 disposed above the emitter 460. If the device is used for display, the substrate can be silicon or transparent substrate. Referring to FIG. 3, a front panel 450 is disposed upward and above the stacked gate. A variety of visual images are displayed on the front panel 450. A fluorescent film 480 is attached to a bottom surface of the front panel 450 that faces the stacked gate and a direct current voltage is applied to the fluorescent film 480 to emit color for display. The fluorescent substance may emit color light by mixing the emitted light of the thin film with R, G, B fluorescent substances. The present disclosure describes three such emission displays that separately display images in red components, green components, and blue components (namely, red, green, and blue images). The fluorescent substances emit red, green, and blue visible light when excited by the electron beam which is evenly distributed on the fluorescent film 480. A spacer separating the front panel 450 from the stacked gate is a black matrix layer and is not shown for convenience. Due to the thin film display formed with thinner thickness and the power consumption being lower than an LCD, the present invention may provide a smaller, lighter weight device. The life of a battery may last longer. The field emission device does not require complicated, power-consuming back lights and filters which are necessary for LCD. Moreover, the device does not require large arrays of thin film transistors, and thus, a major source of high cost and yield problems for active matrix LCDs is eliminated. The resolution of the display can be improved by using a focus grid to collimate electrons drawn from the microtips. Preferably, the emitter includes a carbon nanotube emitter to further reduce the device size. Further, the display may omit the liquid crystal material. Further, the field emission display does not require the SID regions which are required by TFT for LCD. Preferably, an LED source may irradiate mono color light. Namely, blue light, red light, and green light LEDs are employed to act as the light source. In one case, the LED may be formed in a matrix or linear configuration. Please note that the elements with fluorescent substances shown in FIG. 3 (carbon nanotube field emission device if the emitter is formed by carbon nanotube) and FIG. 4 (EL) can be used as light sources as well. Similarly, the light source unit can be formed by three mono-light FED (or EL) or a single FED (EL) which may emit three mono-lights. For the organic EL display, refer to U.S. Pat. No. 6,023,371, entitled "Color conversion material, and organic electroluminescent color display using the same." Please note, a laser diode may be used as a light source. Alternatively, the color light source unit 1100C may be composed of a laser 1101 and a color conversion module 1102 positioned on the light path of the laser as shown in FIG. 1A. Preferably, color conversion module 1102 may be achieved by an efficient laser wavelength conversion technology, which enables the generation and conversion of new laser wavelengths via the material's nonlinear character. Based on engineered microstructures within ferroelectric nonlinear materials, quasi-phase-matching (QPM) is generated to compensate the phase-velocity mismatching between interaction waves for efficient wave-mixings. The QPM enables laser-based R, G, B display applications. In order to achieve efficient wavelength conversion, phase matching between interaction waves is required. This has been done in nonlinear materials through birefringence phase-matching techniques, which orient a crystal axis to a specific angle to achieve a phase-matching condition for specific interaction wavelengths. U.S. Pat. No. 7,170,671, entitled "High efficiency wavelength converters," discloses one method of the wavelength conversion. For example, the color conversion module 1102 may include a waveguide with multiple gratings with different periodic patterns as shown in FIG. 1B. The color conversion module may include a waveguide device or a bulk device. The grating could be uniform grating, multiple grating, cascade grating, fan out grating, and chirped grating. The laser sequentially provides the radiation to the color conversion module 1100A, thereby converting the incident light into R, G, B, respectively.

In another embodiment, the light source of FIG. 4 includes a transparent electrode 510 on a transparent substrate 500. A fluorescent film or powder 520 is attached to an upper surface of the lower transparent electrode 510. Preferably, the fluorescent substance emits colored light. The present disclosure describes three such devices that separately emit light in red components, green components, and blue components. Each irradiates a single color light. Different powders emit different colors. An upper transparent electrode 530 is formed on the fluorescent film or powder 520. A second transparent substrate 540 is formed on the transparent electrode 530. A bias is applied on the electrodes to inject a hole and an electron, thereby exciting the fluorescent substances by the combination of the electron and hole to emit red, green, or blue visible light depending on the compound of the fluorescent substances. The elements may refer to ELP. In the examples, the light-emitting device (LED) can be employed as a light source as well, and the mechanism and process is simpler than prior art. Preferably, LED sources that irradiate blue light, red light, and green light LEDs are employed as the three mono-color light sources.

From above, the color filter wheel, a high temperature white light source, and a lot of lenses, such as condense lenses are removed according to the present disclosure. Therefore, the thermal issue, huge size, and flashing effect are solved by the present disclosure. Furthermore, the present disclosure describes employing thin film as a cold light source, with no high temperature thermal issue, where the lift time of the source is longer than the white light source of prior art, and where motor vibration noise is omitted. The power consumption is far lower than the prior art and it may be integrated into a small volume portable device. Having undergone switching by the color control module in such a manner that the light has any one of the red, blue, and green colors and travels toward the DMD panel 1200, and its luminous flux may be calibrated by a relay lens (not shown) so that the light is effectively applied to the DMD panel 1200. The light applied to the DMD panel 1200 is incident on each of the mirror elements. The DMD panel 1200 receives an input signal with a gray level signal used to control an inclination of each of the mirror elements according to a gray level of each of the red, blue, and green colors represented by a video signal. The correction method and the control of a state of inclination of a mirror are well known in the art. Each image light is obtained by operating minor elements of the DMD panel 1200, thereby projecting a single picture element on the screen. Since switching of the color light source unit is sufficiently fast, previous light stays as an afterimage detected by human eyes and almost no case occurs in which a color looks to have been decomposed. In the present disclosure, the lights should be directed to the entire DMD and the present disclosure employs an order and sequence light color control module coupled to the light source unit for emitting different color light, sequentially. During the persistence of vision, the afterimage is thought to persist on the retina.

Figure 5:
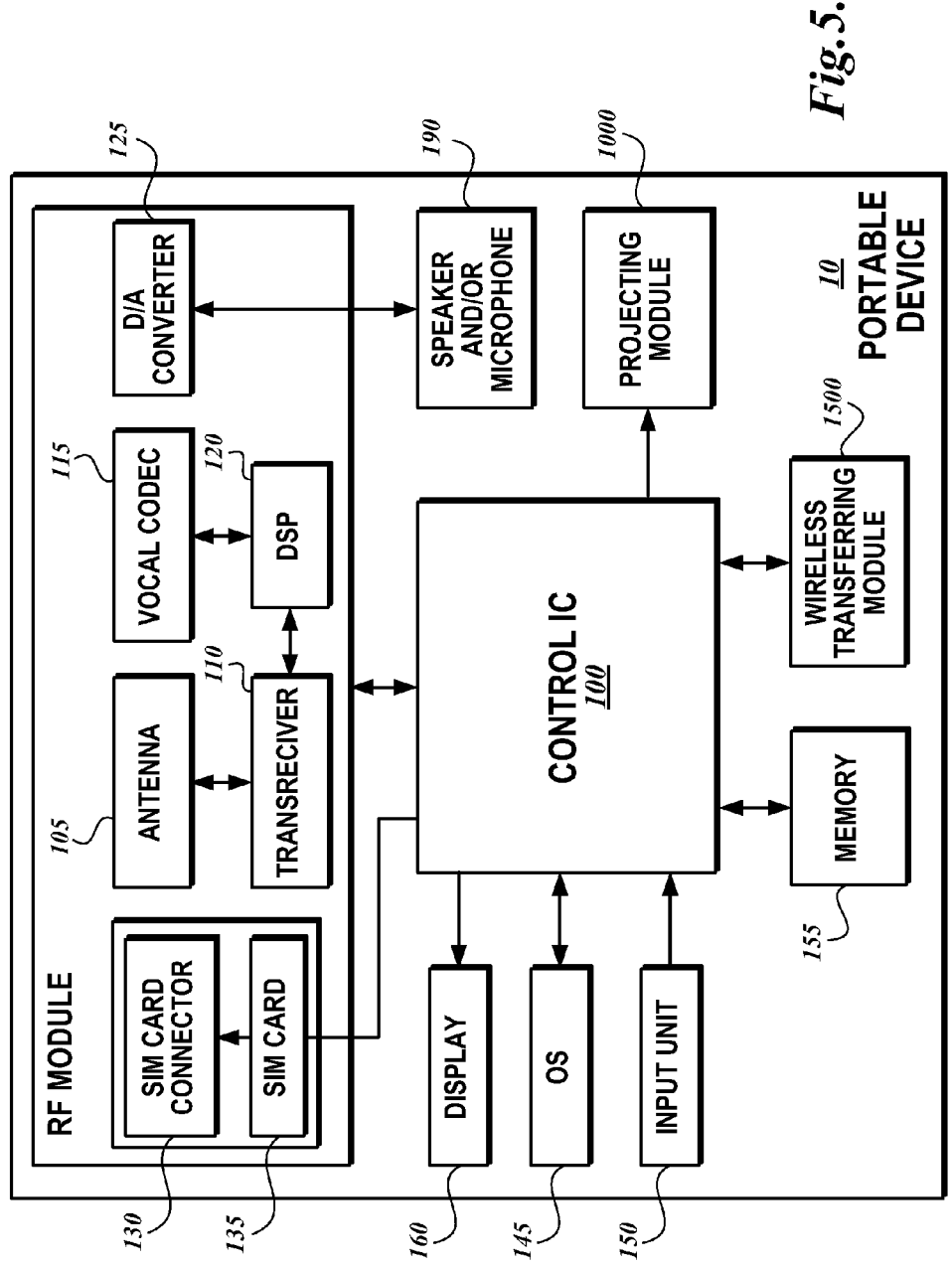
FIG. 5 shows a diagram of a mobile phone with a projector according to the present disclosure.

One or more embodiments of the present disclosure may be integrated into a portable device, for example, a cellular phone. FIG. 5 shows a block diagram of a portable terminal with a SIM card connector 130 to carry the SIM card 135. As is well known in the art, the SIM card is not necessary for some other types of cellular phones such as in a PHS system. The diagram is used for illustration and not for limiting the scope of the present disclosure. The portable terminal or device 10 includes an RF module. As known in the art, the RF module includes an antenna 105. This antenna 105 is connected to a transceiver 110, which is used to receive and transmit signals. The RF module further includes CODEC 115, DSP 120, and D/A converter 125 as well. The device 10 includes a central control IC 100, an input unit 150, a built-in display 160, OS 145, and memory 155 including a ROM program memory, a RAM memory, and a nonvolatile FLASH memory. The RF module may perform the function of signal transmitting and receiving, frequency synthesizing, baseband processing, and digital signal processing. The SIM card hardware interface is used for receiving a SIM card. Finally, the signal is sent to the final actuators, i.e., a loudspeaker and a microphone 190.

Moreover, the portable terminal according to the device 10 shown in FIG. 5 includes the projecting module 1000. An embodiment is now described with reference to FIGS. 1 and 5. A projecting module 1000 is coupled to the control IC 100. The projection lens 1300 could be made up of a plurality of lenses. Thus, the data or file stored in the memory of the device can be projected on a screen or wall. It allows the user to project an image, game, or file on an external screen. The EL element is small, flat form, and lightweight; therefore, it allows the small projection module to be integrated in the portable device. Similarly, the projecting module could be integrated into a notebook computer, PDA, video camera, digital still camera, game player, or media player.

The projector or the portable device may include a wireless transferring module 1500 coupled to the central control unit 100 for transferring data wirelessly and it may be employed to transfer data between a hand-held device and an external device such as an access point or a computer (local or remote terminal) via a network. In one embodiment, the wireless transmission module 1500 for short range refers to a WLAN (wireless local area network) module. As known, the WLAN may transfer data between a portable device and the external device. Thus, the device 10 may employ the wireless transmission module 1500 to exchange data. The wireless transmission module 1500 is compatible with the WiFi, 802.11 standard (802.11a, 802.11b, 802.11g, 802.11n), Bluetooth standard, or WiMax. In general, the wireless transmission module 1500 allows the device 10 to couple to the Internet via an access point, gateway, or computer. Thus, the user may download the material, data, image, game, audio, or video from the Internet and project the downloaded data on the screen.

Figure 6:
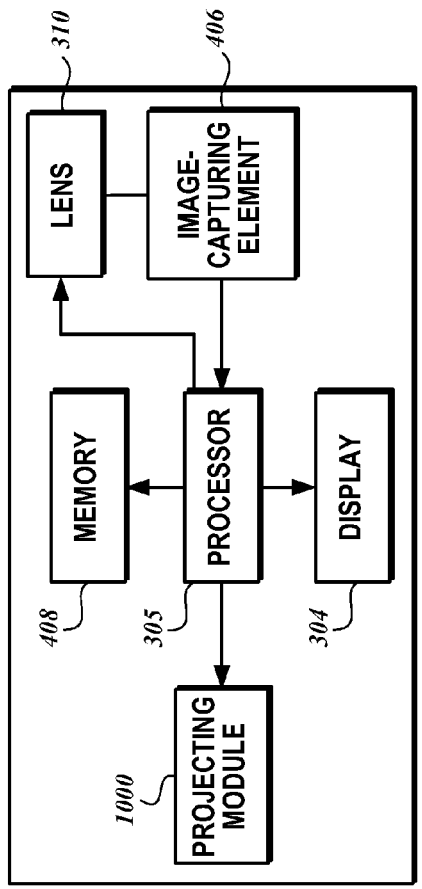
FIGS. 6 and 7 show diagrams of an image-capturing device and media player with a projector according to the present disclosure.
Figure 7:
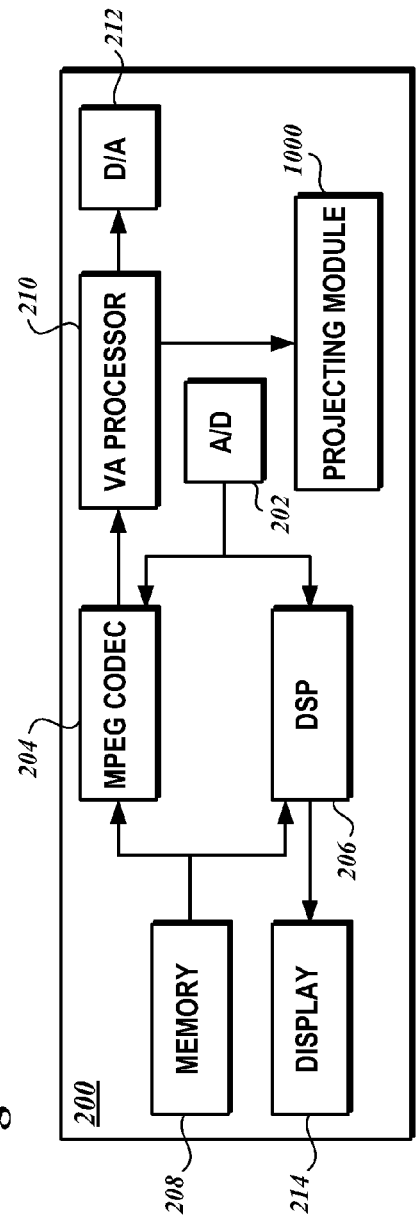

Further, referring to FIG. 6, the device includes a main body having a processor 305; a display 304 formed on the main body and coupled to the processor 305; an image capture element 406 formed within the main body and coupled to the processor 305; a memory 408 coupled to the processor; a lens mechanism 310 formed on the main body, coupled to the processor 305 and corresponding to the image capture element 406; the projecting module 1000 is coupled to a processor of the portable device so as to project the captured image on a screen.

If the projecting module 1000 is employed for a media player such as an MP3 player or MP4 player, the player includes an analog/digital (A/D) converter 202 for converting analog audio signals into digital audio signals. The analog audio signals can come from an audio source coupled to the player 200. A digital signal processor (DSP) 206 or an audio and/or video driving module 204, for instance MP3 or MP4 codec, are coupled to the A/D converter 202 to receive the digital audio signals. In one embodiment, MP3 or MP4 codec 204 executes a firmware that includes an MPEG audio layer (e.g., MP3, MP2, or both) codec or video codec (e.g., MP4), and DSP 206 executes a firmware that includes a different type of audio codec (e.g., WMA, AAC, or both). In one embodiment, the firmware for DSP 206 also includes a video codec for encoding and decoding videos (e.g., MPEG-4 V1/V2/V3, DivX 3.11/4.0/5.0, Xvid, AVI/ASF, or any combination thereof). MP3 (or MP4) codec 204 and DSP 206 are coupled to a nonvolatile memory 208 that stores the compressed audio data. The user can select an audio file from nonvolatile memory 208. Codec 204 and DSP 206 are coupled to an audio processor 210, which processes the digital audio signals according to default settings or user instructions. Audio processor 210 is coupled to a digital/analog (D/A) converter 212, which converts the digital audio signals into analog audio signals for the user. A display 214 is coupled to the DSP 206.

Figure 8:
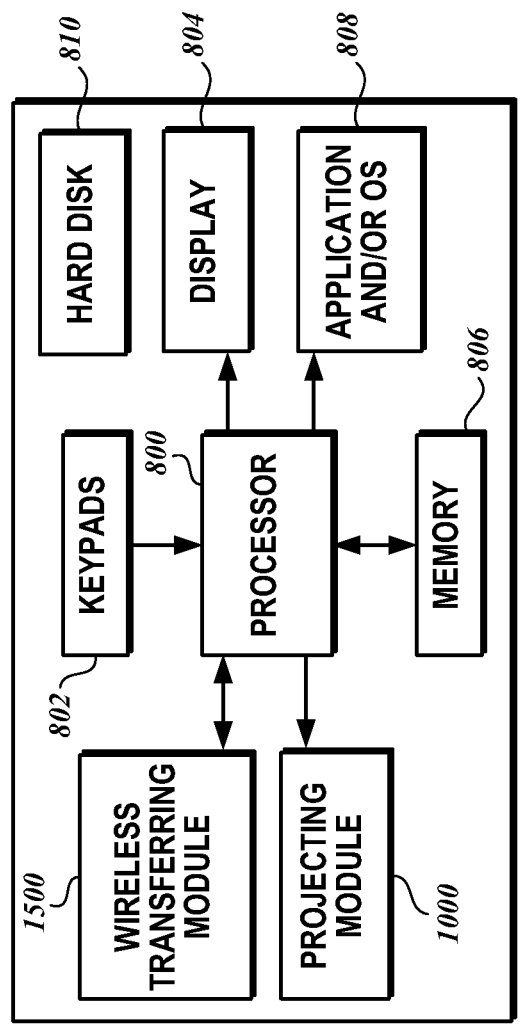
FIG. 8 shows a diagram of a computer (e.g., a notebook computer) with a projector according to the present disclosure.

As shown in FIG. 8, the projecting module 1000 can be integrated into the portable computer system, comprising: a processor 800 formed within the portable device; a keypad 802 formed on the portable device; a display 804 coupled the processor; and a memory 806 coupled to said processor 800. The device further includes an application and/or OS 808 and hard disk 810 coupled to the processor. It further includes the WLAN module 1500 and the projecting module 1000.

As will be understood by persons skilled in the art, the foregoing description is illustrative, rather than limiting. Modification will now suggest itself to those skilled in the art. Thus, the invention is not to be limited to this embodiment, but rather the invention is intended to cover various modifications and similar arrangements included within the spirit and scope of the claimed subject matter, the scope of which should be accorded the broadest interpretation so as to encompass all such modifications and similar structures.

I claim:

1. A filter-free projector comprising:
a light source unit configured to generate light beams with different colors;
a sequence light color control module coupled to said light source unit and configured to switch said light source unit to emit light of different colors in a sequence;
a digital mirror device panel having a plurality of mirror elements each configured to be controlled so as to reflect light fed from said light source unit; and
a projection lens positioned in a reflected light path from said digital mirror device panel, said lens configured to project an image.

2. The filter-free projector of claim 1, wherein said light source unit comprises an organic electroluminescence element configured to emit red, green, or blue light.

3. The filter-free projector of claim 1, wherein said light source unit comprises an LED element configured to emit red, green, or blue light.

4. The filter-free projector of claim 1, wherein said light source unit includes a field-emitting element configured to emit red, green, or blue light.

5. The filter-free projector of claim 1, wherein said light source unit includes a carbon nanotube emitting element configured to emit red, green, or blue light.

6. The filter-free projector of claim 1, wherein said light source unit comprises an electroluminescence element configured to emit red, green, or blue light.

7. The filter-free projector of claim 1, wherein said light source unit comprises a laser diode configured to emit red, green, or blue light.

8. The filter-free projector of claim 1, wherein said light source unit comprises a laser and a color conversion module configured to emit red, green, or blue light.

9. The filter-free projector of claim 8, wherein said color conversion module comprises a waveguide with multiple gratings having different periodic patterns.

10. The filter-free projector of claim 1, further comprising a wireless transferring module.

11. The filter-free projector of claim 10, wherein said wireless transferring module is compatible with a wireless standard selected from the group consisting of an 802.11 standard, Bluetooth, and WiMax.

12. The filter-free projector of claim 1, wherein said filter-free projector is embedded into a portable device selected from the group consisting of a cellular phone, a notebook computer, a GPS device, a PDA, a game player, a media player, a video camera, and a still camera.

13. The filter-free projector of claim 12, wherein said portable device comprises a wireless transferring module that is compatible with a wireless standard selected from the group consisting of an 802.11 standard, Bluetooth, and WiMax.

* * * * *